US012587853B2

(12) United States Patent
Kazi

(10) Patent No.: US 12,587,853 B2
(45) Date of Patent: Mar. 24, 2026

(54) MANAGING NETWORK ACCESS FOR VULNERABLE DEVICES

(71) Applicant: T-MOBILE INNOVATIONS LLC, Overland Park, KS (US)

(72) Inventor: Ariful Islam Kazi, Renton, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 53 days.

(21) Appl. No.: 18/809,544

(22) Filed: Aug. 20, 2024

(65) Prior Publication Data

US 2026/0059312 A1     Feb. 26, 2026

(51) Int. Cl.
H04W 12/08          (2021.01)
H04W 8/18           (2009.01)
H04W 12/126          (2021.01)

(52) U.S. Cl.
CPC ............. H04W 12/08 (2013.01); H04W 8/18 (2013.01); H04W 12/126 (2021.01)

(58) Field of Classification Search
CPC ...... H04W 12/08; H04W 12/126; H04W 8/18
See application file for complete search history.

(56) References Cited

U.S. PATENT DOCUMENTS

2016/0226898 A1 * 8/2016 Mody .................... H04L 51/04
2024/0284180 A1 * 8/2024 Gupta ................... H04W 12/73

* cited by examiner

*Primary Examiner* — Sangseok Park
(74) *Attorney, Agent, or Firm* — SHOOK, HARDY & BACON L.L.P.

(57) ABSTRACT

Systems and methods are provided for managing public network access for devices that are identified as vulnerable devices. Devices may be identified as vulnerable devices based on an identifier associated with a vulnerable status, such as an international mobile subscriber identity (IMSI). Once identified as vulnerable, the network blocks the vulnerable device from accessing the public network (e.g., Internet) by routing the vulnerable device to a designated gateway that is blocked from accessing the public network. The designated gateway provides the vulnerable device with a splash page indicating a corrective action to be taken in order to regain access to the public network.

20 Claims, 4 Drawing Sheets

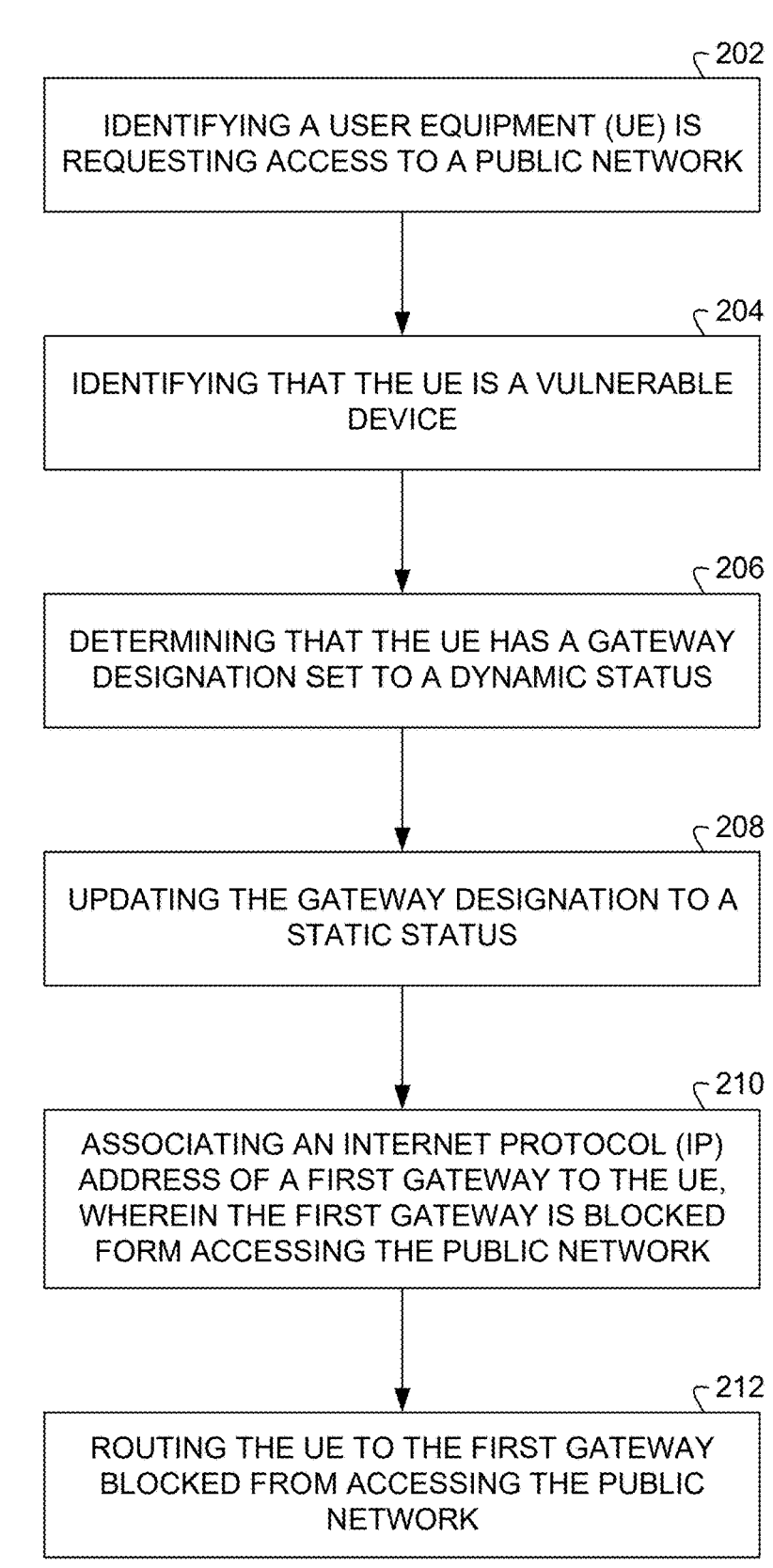

200

202
IDENTIFYING A USER EQUIPMENT (UE) IS REQUESTING ACCESS TO A PUBLIC NETWORK

204
IDENTIFYING THAT THE UE IS A VULNERABLE DEVICE

206
DETERMINING THAT THE UE HAS A GATEWAY DESIGNATION SET TO A DYNAMIC STATUS

208
UPDATING THE GATEWAY DESIGNATION TO A STATIC STATUS

210
ASSOCIATING AN INTERNET PROTOCOL (IP) ADDRESS OF A FIRST GATEWAY TO THE UE, WHEREIN THE FIRST GATEWAY IS BLOCKED FORM ACCESSING THE PUBLIC NETWORK

212
ROUTING THE UE TO THE FIRST GATEWAY BLOCKED FROM ACCESSING THE PUBLIC NETWORK

*FIG. 2*

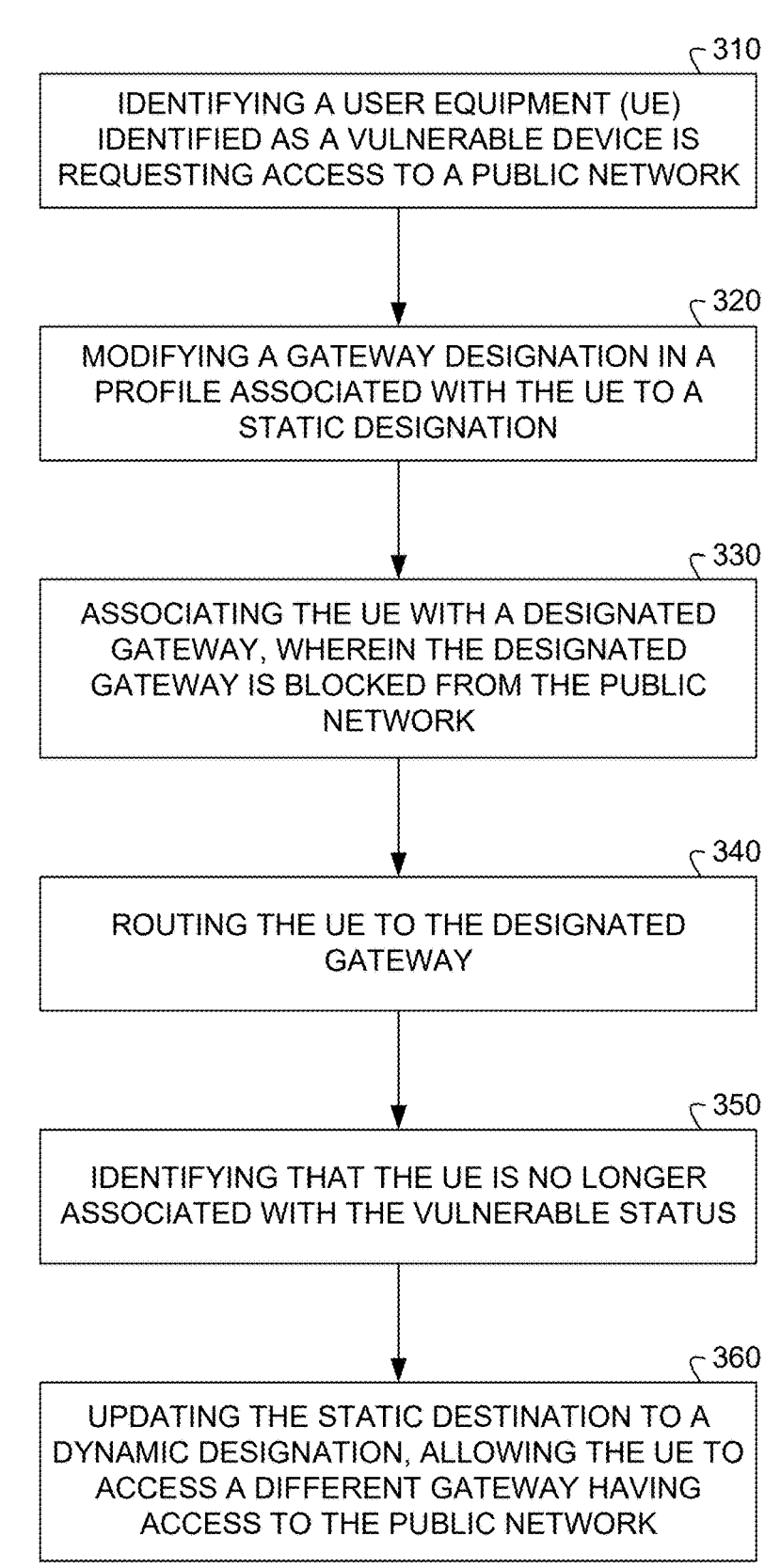

300

310

IDENTIFYING A USER EQUIPMENT (UE) IDENTIFIED AS A VULNERABLE DEVICE IS REQUESTING ACCESS TO A PUBLIC NETWORK

320

MODIFYING A GATEWAY DESIGNATION IN A PROFILE ASSOCIATED WITH THE UE TO A STATIC DESIGNATION

330

ASSOCIATING THE UE WITH A DESIGNATED GATEWAY, WHEREIN THE DESIGNATED GATEWAY IS BLOCKED FROM THE PUBLIC NETWORK

340

ROUTING THE UE TO THE DESIGNATED GATEWAY

350

IDENTIFYING THAT THE UE IS NO LONGER ASSOCIATED WITH THE VULNERABLE STATUS

360

UPDATING THE STATIC DESTINATION TO A DYNAMIC DESIGNATION, ALLOWING THE UE TO ACCESS A DIFFERENT GATEWAY HAVING ACCESS TO THE PUBLIC NETWORK

FIG. 3

MANAGING NETWORK ACCESS FOR VULNERABLE DEVICES

SUMMARY

A high-level overview of various aspects of the present technology is provided in this section to introduce a selection of concepts that are further described below in the detailed description section of this disclosure. This summary is not intended to identify key or essential features of the claimed subject matter, nor is it intended to be used as an aid in isolation to determine the scope of the claimed subject matter.

In aspects set forth herein, systems and methods are provided for identifying and managing vulnerable devices in a network. More particularly, in aspects set forth herein, systems and methods enable blocking vulnerable device access to a network by forcing redirection to a specific public data network gateway (PDN-GW). Once there, a splash page with corrective action is provided to the vulnerable device.

BRIEF DESCRIPTION OF THE SEVERAL VIEWS OF THE DRAWINGS

Implementations of the present disclosure are described in detail below with reference to the attached drawing figures, wherein:

FIG. 2 depicts a flow diagram of a method for managing vulnerable devices, in accordance with aspects herein;

FIG. 3 depicts a flow diagram of a method for managing vulnerable devices, in accordance with aspects herein.

DETAILED DESCRIPTION

Figure 1:
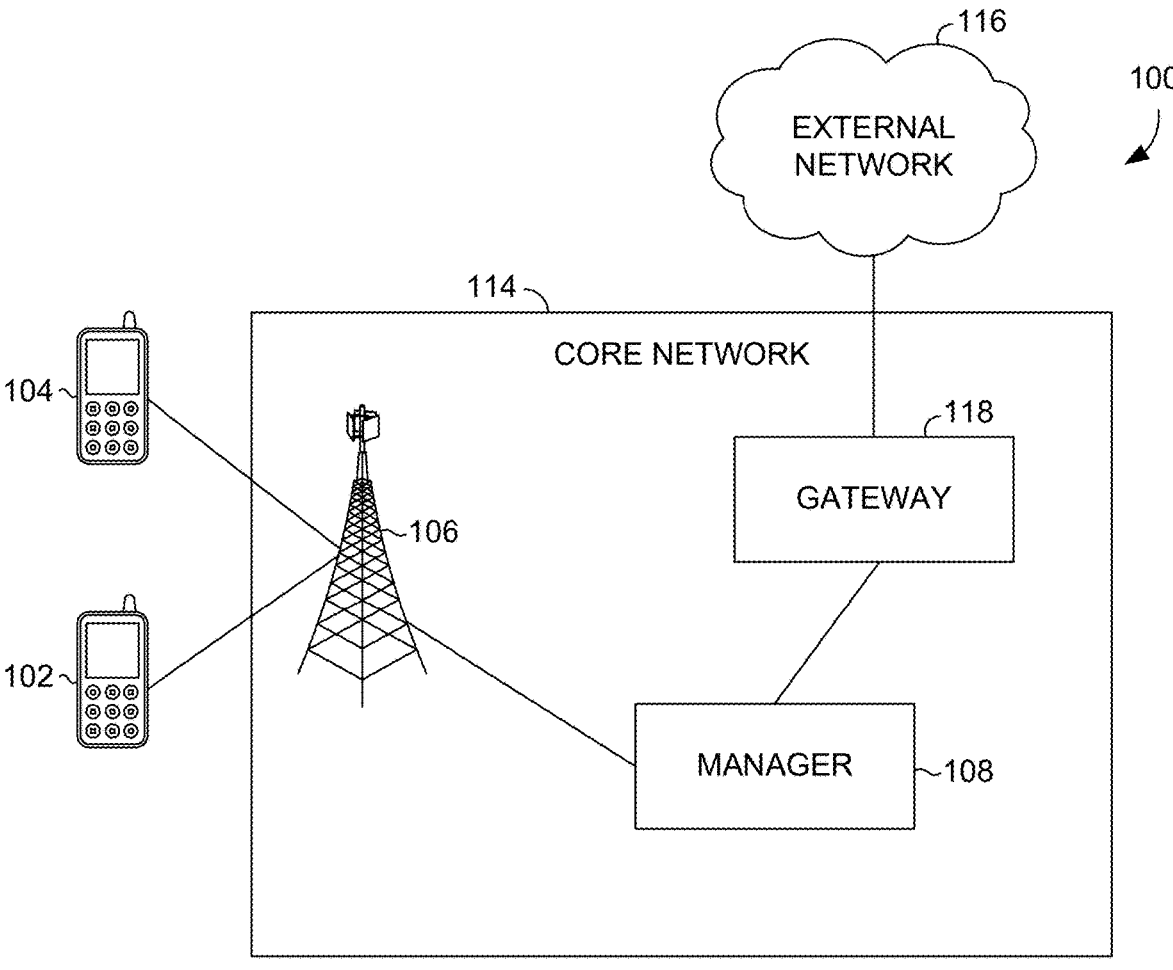
FIG. 1 depicts a diagram of an exemplary network environment in which implementations of the present disclosure may be employed, in accordance with aspects herein.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

| | |
|---|---|
| 3G | Third-Generation Wireless Technology |
| 4G | Fourth-Generation Cellular Communication System |
| 5G | Fifth-Generation Cellular Communication System |
| AMF | Access & Mobility Management Function |
| APN | Access Point Name |
| CD-ROM | Compact Disk Read Only Memory |
| CDMA | Code Division Multiple Access |
| eNodeB | Evolved Node B |
| GIS | Geographic/Geographical/Geospatial Information System |
| gNodeB | Next Generation Node B |
| GPRS | General Packet Radio Service |
| GSM | Global System for Mobile communications |
| iDEN | Integrated Digital Enhanced Network |
| DVD | Digital Versatile Discs |
| EEPROM | Electrically Erasable Programmable Read Only Memory |
| LED | Light Emitting Diode |
| LTE | Long Term Evolution |
| MIMO | Multiple Input Multiple Output |
| MD | Mobile Device |
| PC | Personal Computer |
| PCF | Policy Control Function |
| PCS | Personal Communications Service |
| PDA | Personal Digital Assistant |
| RAM | Random Access Memory |
| RET | Remote Electrical Tilt |
| RF | Radio-Frequency |
| RFI | Radio-Frequency Interference |
| R/N | Relay Node |
| ROM | Read Only Memory |
| SINR | Transmission-to-Interference-Plus-Noise Ratio |
| SMF | Session Management Function |
| SNR | Transmission-to-noise ratio |
| SON | Self-Organizing Networks |
| TDMA | Time Division Multiple Access |
| TXRU | Transceiver (or Transceiver Unit) |
| UDM | Unified Data Management Function |
| UDR | Unified Data Repository |
| UE | User Equipment |
| UPF | User Plane Function |

Further, various technical terms are used throughout this description. An illustrative resource that fleshes out various aspects of these terms can be found in Newton's Telecom Dictionary. 32d Edition (2022).

As used herein, the term "node" is used to refer to network access technology for the provision of wireless telecommunication services from a base station to one or more electronic devices, such as an eNodeB, gNodeB, etc.

Embodiments of the present technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and non-volatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional telecommunications network employs a plurality of base stations (i.e., cell sites, cell towers) to provide network coverage. The base stations are employed to broadcast and transmit transmissions to user devices of the telecommunications network. An access point may be considered to be a portion of a base station that may comprise an antenna, a radio, and/or a controller.

As employed herein, a UE (also referenced herein as a user device) or WCD can include any device employed by an end-user to communicate with a wireless telecommunications network. A UE can include a mobile device, a mobile broadband adapter, or any other communications device employed to communicate with the wireless telecommunications network. A UE, as one of ordinary skill in the art may appreciate, generally includes one or more antenna coupled to a radio for exchanging (e.g., transmitting and receiving) transmissions with a nearby base station.

The present disclosure is directed to managing vulnerable devices. In particular, the present disclosure is directed to managing network access to vulnerable devices. Devices may be identified as vulnerable devices based on an identifier associated with a vulnerable status, such as an international mobile subscriber identity (IMSI). Once identified as vulnerable, the network blocks the vulnerable device from accessing the public network (e.g., Internet) by routing the vulnerable device to a designated gateway that is blocked from accessing the public network. The designated gateway provides the vulnerable device with a splash page indicating a corrective action to be taken in order to regain access to the public network.

Accordingly, a first aspect of the present disclosure is directed to a system for managing vulnerable devices. The system comprises one or more processors; and one or more computer-readable media storing computer-usable instructions that, when executed by the one or more processors, cause the one or more processors to: identify a user equipment (UE) is requesting access to a public network; identify that the UE is a vulnerable device, wherein a vulnerable device is a device having an identifier associated with a vulnerable status; determine that the UE has a gateway designation set to a dynamic status, wherein the dynamic status allows the UE to connect with one of a plurality of gateways; update the gateway designation to a static status; associate an Internet Protocol (IP) address of a first gateway to the UE, wherein the first gateway is blocked from accessing the public network; and route the UE to the first gateway blocked from accessing the public network.

A second aspect of the present disclosure is directed to a method for managing vulnerable devices. The method comprises identifying a user equipment (UE) is requesting access to a public network; identifying that the UE is a vulnerable device, wherein a vulnerable device is a device having an identifier associated with a vulnerable status; determining that the UE has a gateway designation set to a dynamic status, wherein the dynamic status allows the UE to connect with one of a plurality of gateways; updating the gateway designation to a static status; associating an Internet Protocol (IP) address of a first gateway to the UE, wherein the first gateway is blocked from accessing the public network; and routing the UE to the first gateway blocked from accessing the public network.

Another aspect of the present disclosure is directed to a method for managing vulnerable devices. The method comprises identifying a user equipment (UE) identified as a vulnerable device is requesting access to a public network, wherein the UE is identified as a vulnerable device with an identifier associated with a vulnerable status; modifying a gateway designation in a profile associated with the UE to a static designation; associating the UE with a designated gateway, wherein the designated gateway is blocked from the public network; routing the UE to the designated gateway; identifying that the UE is no longer associated with the vulnerable status; and updating the static designation to a dynamic designation, allowing the UE to access a different gateway having access to the public network.

Turning to FIG. 1, a network environment suitable for use in implementing embodiments of the present disclosure is provided. Such a network environment is illustrated and designated generally as network environment 100. Network environment 100 is but one example of a suitable network environment and is not intended to suggest any limitation as to the scope of use or functionality of the disclosure. Neither should the network environment 100 be interpreted as having any dependency or requirement relating to any one or combination of components illustrated.

Figure 4:
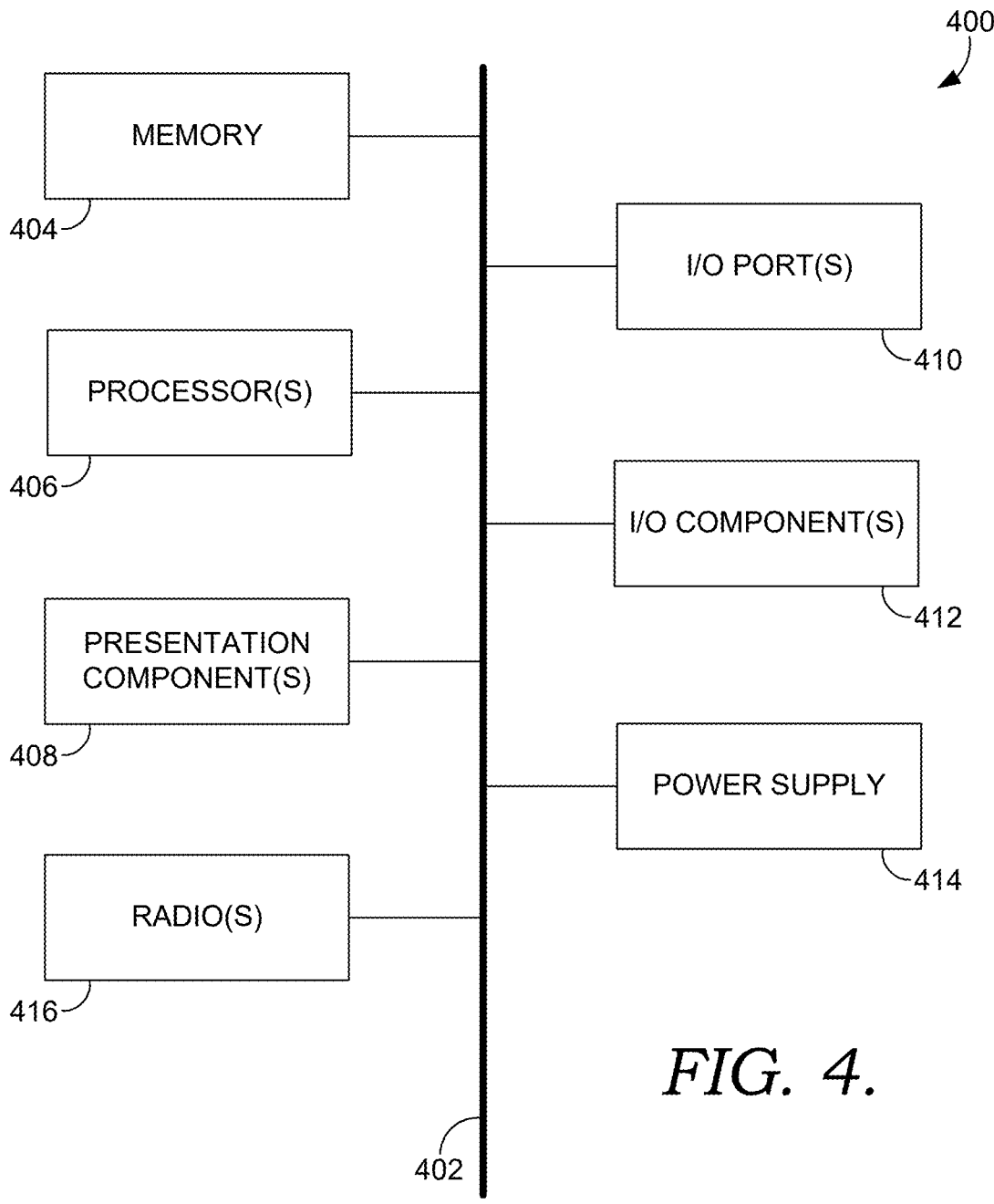
FIG. 4 depicts a diagram of an exemplary computing environment suitable for use in implementations of the present disclosure, in accordance with aspects herein.

A network cell may comprise a base station to facilitate wireless communication between a communications device within the network cell, such as communications device 400 described with respect to FIG. 4, and a network. As shown in FIG. 1, communications device may be UE 102 or UE 104 (referenced herein as the singular UE 102 for simplicity, but not to imply a single UE as multiple UEs are relevant in aspects herein). In the network environment 100, UE 102 may communicate with other devices, such as mobile devices, servers, etc. The UE 102 may take on a variety of forms, such as a personal computer, a laptop computer, a tablet, a netbook, a mobile phone, a Smart phone, a personal digital assistant, or any other device capable of communicating with other devices. For example, the UE 102 may take on any form such as, for example, a mobile device or any other computing device capable of wirelessly communicating with the other devices using a network. Makers of illustrative devices include, for example, Research in Motion, Creative Technologies Corp., Samsung, Apple Computer, and the like. A device can include, for example, a display(s), a power source(s) (e.g., a battery), a data store(s), a speaker(s), memory, a buffer(s), and the like. In embodiments, UE 102 comprises a wireless or mobile device with which a wireless telecommunication network(s) can be utilized for communication (e.g., voice and/or data communication). In this regard, the UE 102 can be any mobile computing device that communicates by way of, for example, a 5G network.

The UE 102 may utilize a network to communicate with other computing devices (e.g., mobile device(s), a server(s), a personal computer(s), etc.). In embodiments, the network is a telecommunications network 114, or a portion thereof. A telecommunications network might include an array of devices or components, some of which are not shown so as to not obscure more relevant aspects of the invention. Components such as terminals, links, and nodes (as well as other components) may provide connectivity in some embodiments. The network 114 may include multiple networks. The network 114 may be part of a telecommunications network that connects subscribers to their immediate service provider. In embodiments, the network is associated with a telecommunications provider that provides services to user devices, such as UE 102. For example, the network 114 may provide voice services to user devices or corresponding users that are registered or subscribed to utilize the services provided by a telecommunications provider.

The UE 102, at times, may also seeks to connect to an external network 116, such as the Internet. In doing so, the UE 102 may attach to the network 114 in a normal fashion by establishing a session in the network 114 via the base station 106. Generally, the UE 102 would be routed to a gateway 118, such as a packet data network gateway (PGW) to access the external gateway 116. However, simply routing the UE 102 to a gateway to access the external network 116 allows vulnerable devices to access the external network 116. UEs are capable of such routing due to a gateway designation in a profile associate with the UE 102. For instance, a UE profile may have a dynamic gateway designation, meaning that the UE 102 can connect to any available gateway. This allows the UE 102 to establish a connection with an available gateway to access external networks 116. In aspects herein, a manager 108 is configured to evaluate a user profile associated with a UE, such as UE 102, and manipulate or change the gateway designation as needed.

The manager 108 initially evaluates a profile of the UE 102 to determine whether the UE is a vulnerable device. A vulnerable device, as used herein, refers generally to a device that is associated with a vulnerable status. A vulnerable status can be associated with a device when one or more identifiers associated with the device are associated with a vulnerable status. The one or more identifiers can include an international mobile subscriber identity (IMSI), or any other identifier that identifies a particular user device. A device can be determined to be vulnerable when a software version of the device requires updating, or any other parameter determined by a network to compromise the network if the UE 102 were to be allowed access to a public network. Once determined that the UE 102 is a vulnerable device, the identifier (e.g., the IMSI) is associated with a vulnerable status. This association may be stored in a database in a lookup table, or in any other fashion accessible to the manager 108. The manger 108 can periodically evaluate UEs to determine if the vulnerable status of the UE requires updating. This period evaluation can be performed at predetermined time intervals, such as hourly, every 2 hours, and the like.

Subsequently, when the UE 102 attaches to the network 114 via the base station 106, the manager 108 is capable of determining that the UE 102 is a vulnerable device (due to the association of the UE 102 IMSI being associated with a vulnerable status). If the UE 102 is requesting access to the external network 116, the manager 108 is configured to take actions to block access of the UE 102 to the external network 116. The manager 108 initially identifies, within a profile of the UE 102, a gateway designation. A gateway designation can be either dynamic or static. A dynamic gateway designation, as used herein, refers to a gateway designation that allows a UE to connect to any available gateway. A static designation, in contrast, refers to a gateway designation that allows a UE to connect only to a specific gateway. Typically, a UE will have a dynamic gateway designation in order to be able to connect to any available gateway that is nearest and most capable of executing the requested action (e.g., accessing the external network 116). The manager 108, in the instance where the UE 102 is identified as a vulnerable device, is configured to change the gateway designation from dynamic to static. Once the gateway designation is changed to a static designation, the manager 108 provides an address of a designated gateway 118 to the UE 102 (such as an Internet Protocol (IP) address) such that the UE 102 is able to connect to only the specified designated gateway. Additionally, because the UE 102 is a vulnerable device, the designated gateway 118 has been blocked from accessing the external network 116. In aspects, the designated gateway 118 is a separate gateway from other gateways that access the external network 116. In other aspects, the designated gateway 118 is a separate path of a single gateway that is not able to access the external network 116 while other paths within the same single gateway are able to access the external network 116.

The UE 102 is then routed to the designated gateway 118 where the UE 102 is presented with a splash page. A splash page, as used herein, refers to the first page presented to a user for a specified location. In this case, the splash page is the first and only page presented to the user, since the designated gateway 118 is blocked access from the external network 116. The splash page, in aspects, provides the UE 102 with a notification that access to the external network 116 is blocked. The notification can also include a corrective action that must be taken to cure the vulnerable status before access to the external network 116 will be granted. In aspects, the corrective action is a software version update.

The manager 108 can monitor for completion of the corrective action at predetermined time intervals such as every 30 minutes, hourly, every two hours, and the like. When the manager 108 determines that the corrective action has been completed, the identifier of the UE 102 (e.g., the IMSI) can be removed from the vulnerable status listing such that it is no longer associated with a vulnerable status. Additionally, upon removing the vulnerable status from the UE 102, the gateway designation is reset back from static to dynamic, such that the UE 102 can access the external network 116 via any available gateway.

It is important to note that the manager 108 is configured to perform all of the decision-making, rather than any edge nodes of the network 114. While, at first glance, it may seem desirable to perform decisions and routing at the gateway itself or an edge node, the load on the gateway/edge node in those instances would quickly become too high and performance would decline. Latency increases with edge node function computations. In the present disclosure, no action is taken at the edge node. Furthermore, the present invention allows for designated gateways such that the manager 108 can easily identify vulnerable devices and route them to a designated gateway, rather than needing to perform additional actions to make sure the vulnerable device is provided with a different page than all of the other devices routed to the same gateway. Thus, the designated gateway further eases the load on the manager 108 by eliminating the management of page displays and providing an efficient designated route for vulnerable devices where the only option is to be provided with the splash page including corrective actions.

In additional aspects, the manager 108 is configured to safeguard some devices from being directed to the designated gateway 118. For instance, devices that are identified as security devices, medical personnel, and the like may avoid being directed to the designated gateway 118 even if they are associated with a vulnerable status. In those instances, the manager 108 can provide periodic notifications to the vulnerable devices to take a corrective action to cure the vulnerable status but continue to allow the vulnerable devices to access the external network 116 via any gateway and not be blocked from access.

Turning to FIG. 2, a flow diagram 200 is provided illustrating a flow to manage vulnerable devices. At block 202, a user equipment (UE) is identified as requesting access to a public network. In aspects, the public network is the Internet. At block 204, the UE is identified to be a vulnerable device. This identification can be based on any device-identifying identifier being associated with a vulnerable status such that when cross-referenced, the device is listed as having a vulnerable status. At block 206, it is determined that the UE has a gateway designation set to a dynamic status. The gateway designation is updated to a static status at block 208. An Internet Protocol (IP) address of a first gateway is associated with the UE at block 210. The first gateway is blocked from accessing the public network. At block 212, the UE is routed to the first gateway that is blocked from accessing the public network.

Referring to FIG. 3, a flow diagram 300 is provided illustrating a flow to manage vulnerable devices. Initially, at block 310, it is identified that a user equipment (UE) identified as a vulnerable device is requesting access to a public network. In aspects, the public network is the Internet. In additional aspects, the UE is identified as a vulnerable device with an identifier associated with a vulnerable status, such as an IMSI. At block 320, a gateway designation is modified in a profile associated with the UE to a static designation. At block 330, the UE is associated with a designated gateway that is blocked from the public network. The UE is routed to the designated gateway at block 340. At block 350, it is identified that the UE is no longer associated with the vulnerable status. The static designation is updated to a dynamic designation at block 360, allowing the UE to access a different gateway having access to the public network.

Referring to FIG. 4, a block diagram of an exemplary computing device 400 suitable for use in implementations of the technology described herein is provided. In particular, the exemplary computer environment is shown and designated generally as computing device 400. Computing device 400 is but one example of a suitable computing environment and is not intended to suggest any limitation as to the scope of use or functionality of the invention. Neither should computing device 400 be interpreted as having any dependency or requirement relating to any one or combination of components illustrated. It should be noted that although some components in FIG. 4 are shown in the singular, they may be plural. For example, the computing device 400 might include multiple processors or multiple radios. In aspects, the computing device 400 may be a UE/WCD, or other user device, capable of two-way wireless communications with an access point. Some non-limiting examples of the computing device 400 include a cell phone, tablet, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

As shown in FIG. 4, computing device 400 includes a bus 402 that directly or indirectly couples various components together, including memory 404, processor(s) 406, presentation component(s) 408 (if applicable), radio(s) 416, input/output (I/O) port(s) 410, input/output (I/O) component(s) 412, and power supply(s) 414. Although the components of FIG. 4 are shown with lines for the sake of clarity, in reality, delineating various components is not so clear, and metaphorically, the lines would more accurately be grey and fuzzy. For example, one may consider a presentation component such as a display device to be one of I/O components 412. Also, processors, such as one or more processors 406, have memory. The present disclosure hereof recognizes that such is the nature of the art, and reiterates that FIG. 4 is merely illustrative of an exemplary computing environment that can be used in connection with one or more implementations of the present disclosure. Distinction is not made between such categories as "workstation," "server," "laptop," "handheld device," etc., as all are contemplated within the scope of the present disclosure and refer to "computer" or "computing device."

Memory 404 may take the form of memory components described herein. Thus, further elaboration will not be provided here, but it should be noted that memory 404 may include any type of tangible medium that is capable of storing information, such as a database. A database may be any collection of records, data, and/or information. In one embodiment, memory 404 may include a set of embodied computer-executable instructions that, when executed, facilitate various functions or elements disclosed herein. These embodied instructions will variously be referred to as "instructions" or an "application" for short.

Processor 406 may actually be multiple processors that receive instructions and process them accordingly. Presentation component 408 may include a display, a speaker, and/or other components that may present information (e.g., a display, a screen, a lamp (LED), a graphical user interface (GUI), and/or even lighted keyboards) through visual, auditory, and/or other tactile cues.

Radio 416 represents a radio that facilitates communication with a wireless telecommunications network. Illustrative wireless telecommunications technologies include CDMA, GPRS, TDMA, GSM, and the like. Radio 416 might additionally or alternatively facilitate other types of wireless communications including Wi-Fi, WiMAX, LTE, 3G, 4G, LTE, mMIMO/5G, NR, VoLTE, or other VoIP communications. As can be appreciated, in various embodiments, radio 416 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

The input/output (I/O) ports 410 may take a variety of forms. Exemplary I/O ports may include a USB jack, a stereo jack, an infrared port, a firewire port, other proprietary communications ports, and the like. Input/output (I/O) components 412 may comprise keyboards, microphones, speakers, touchscreens, and/or any other item usable to directly or indirectly input data into the computing device 400.

Power supply 414 may include batteries, fuel cells, and/or any other component that may act as a power source to supply power to the computing device 400 or to other network components, including through one or more electrical connections or couplings. Power supply 414 may be configured to selectively supply power to different components independently and/or concurrently.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. A system for managing vulnerable devices, the system comprising:
   one or more processors; and
   one or more computer-readable media storing computer-usable instructions that, when executed by the one or more processors, cause the one or more processors to:
      identify a user equipment (UE) is requesting access to a public network;
      identify that the UE is a vulnerable device, wherein a vulnerable device is a device having an identifier associated with a vulnerable status;
      determine that the UE has a gateway designation set to a dynamic status, wherein the dynamic status allows the UE to connect with one of a plurality of gateways;
      update the gateway designation to a static status;
      associate an Internet Protocol (IP) address of a first gateway to the UE, wherein the first gateway is blocked from accessing the public network; and
      route the UE to the first gateway blocked from accessing the public network.

2. The system of claim 1, wherein the one or more processors further prompt the UE to take a corrective action to cure the vulnerable status.

3. The system of claim 2, wherein the corrective action is a software version update.

4. The system of claim 2, wherein the prompt is a graphical notification on a splash page.

5. The system of claim 1, wherein the identifier associated with the vulnerable status is an international mobile subscriber identity (IMSI) number.

6. The system of claim 1, wherein the one or more processors further determine that the UE has completed a corrective action.

7. The system of claim 6, wherein the one or more processors remove the identifier from being associated with the vulnerable status.

8. The system of claim 7, wherein the one or more processors reset the gateway designation from static to dynamic.

9. The system of claim 1, wherein the one or more processors monitor for an updated gateway designation.

10. The system of claim 1, wherein the public network is the Internet.

11. A method for managing vulnerable devices, the method comprising:
   identifying a user equipment (UE) is requesting access to a public network;
   identifying that the UE is a vulnerable device, wherein a vulnerable device is a device having an identifier associated with a vulnerable status;
   determining that the UE has a gateway designation set to a dynamic status, wherein the dynamic status allows the UE to connect with one of a plurality of gateways;
   updating the gateway designation to a static status;
   associating an Internet Protocol (IP) address of a first gateway to the UE, wherein the first gateway is blocked from accessing the public network; and
   routing the UE to the first gateway blocked from accessing the public network.

12. The method of claim 11, wherein the gateway is a public data network gateway (PGW).

13. The method of claim 11, wherein the method further comprises prompting the UE to complete a corrective action to cure the vulnerable status.

14. The method of claim 13, wherein the corrective action is a software version update.

15. The method of claim 11, wherein the identifier associated with the vulnerable status is an international mobile subscriber identity (IMSI) number.

16. The method of claim 11, further comprising:
   determining that the UE has completed a corrective action;
   removing the identifier from being associated with the vulnerable status;
   resetting the gateway designation from static to dynamic; and
   monitoring for an updated gateway designation.

17. A method for managing vulnerable devices, the method comprising:
   identifying a user equipment (UE) identified as a vulnerable device is requesting access to a public network, wherein the UE is identified as a vulnerable device with an identifier associated with a vulnerable status;
   modifying a gateway designation in a profile associated with the UE to a static designation;
   associating the UE with a designated gateway, wherein the designated gateway is blocked from the public network;
   routing the UE to the designated gateway;
   identifying that the UE is no longer associated with the vulnerable status; and
   updating the static designation to a dynamic designation, allowing the UE to access a different gateway having access to the public network.

18. The method of claim 17, wherein the identifier associated with the vulnerable status is an international mobile subscriber identity (IMSI) number.

19. The method of claim 17, wherein the UE is no longer associated with the vulnerable status upon completion of a corrective action, wherein the corrective action is a software update.

20. The method of claim 18, further comprising monitoring the UE for an updated gateway designation at predetermined time intervals.

\*  \*  \*  \*  \*